US011082562B2

(12) United States Patent
Alonso Y Caloca et al.

(10) Patent No.: US 11,082,562 B2
(45) Date of Patent: Aug. 3, 2021

(54) CONTACT CENTER SYSTEM AND METHODS FOR HANDLING VOICE AND DATA TELESERVICES THROUGH MOBILE DEVICES

(71) Applicant: Aurelio Luis Miguel Alonso Y Caloca, Mexico City (MX)

(72) Inventors: Aurelio Luis Miguel Alonso Y Caloca, Mexico City (MX); Julio Alonso Carrillo Castillo, Mexico City (MX)

(73) Assignee: Aurelio Luis Miguel Alonso Y Caloca, Mexico City (MX)

( * ) Notice: Subject to any disclaimer, the term of this patent is extended or adjusted under 35 U.S.C. 154(b) by 0 days.

(21) Appl. No.: 16/352,166

(22) Filed: Mar. 13, 2019

(65) Prior Publication Data

US 2019/0335038 A1 Oct. 31, 2019

Related U.S. Application Data

(60) Provisional application No. 62/664,481, filed on Apr. 30, 2018.

(51) Int. Cl.
*H04M 3/51* (2006.01)
*H04M 3/523* (2006.01)
*H04L 29/08* (2006.01)
*H04M 1/72406* (2021.01)

(52) U.S. Cl.
CPC .......... *H04M 3/5191* (2013.01); *H04L 67/10* (2013.01); *H04M 1/72406* (2021.01); *H04M 3/5125* (2013.01); *H04M 3/5133* (2013.01); *H04M 3/5141* (2013.01); *H04M 3/5166* (2013.01); *H04M 3/5175* (2013.01); *H04M 3/5233* (2013.01); *H04M 2203/401* (2013.01);
(Continued)

(58) Field of Classification Search
CPC .... H04L 67/10; H04M 3/5166; H04M 3/5125
USPC ..................................................... 379/265.09
See application file for complete search history.

(56) References Cited

U.S. PATENT DOCUMENTS 6,771,765 B1 * 8/2004 Crowther .............. H04M 3/523
379/265.09
7,092,509 B1 * 8/2006 Mears .................. H04M 3/5233
379/266.01

(Continued)

FOREIGN PATENT DOCUMENTS

WO WO-2006037836 A1 * 4/2006 .......... H04M 3/5125

*Primary Examiner* — Ahmad F. Matar
*Assistant Examiner* — Jirapon Intavong
(74) *Attorney, Agent, or Firm* — Sean Mellino

(57) ABSTRACT

A contact center system and related methods for handling teleservices in voice and data through a plurality of mobile devices such as smartphones is provided. The contact center system is characterized by a very wide functional platform for contact center fully integrated in a single system, with maximum elasticity to increase or decrease capacities based on the characteristics of the cloud, and capable to deliver via an agent mobile platform all the functionality of a fixed-up workstation into a smartphone. The contact center system according to the embodiments is capable to route a call from a customer's device, using a local telecommunications network, to the contact center system, which transforms it into a digital call; the call is assigned to an agent using a mobile platform.

10 Claims, 6 Drawing Sheets

(52) U.S. Cl.
CPC ............... *H04M 2203/6018* (2013.01); *H04M 2203/6045* (2013.01)

(56) References Cited

U.S. PATENT DOCUMENTS

| | | | | |
|---|---|---|---|---|
| 7,269,253 | B1* | 9/2007 | Wu | H04M 3/5233 |
| | | | | 379/265.11 |
| 8,108,237 | B2* | 1/2012 | Bourne | H04M 3/5175 |
| | | | | 705/7.13 |
| 8,767,948 | B1* | 7/2014 | Riahi | H04M 3/4936 |
| | | | | 379/266.08 |
| 9,137,368 | B2* | 9/2015 | Jasper | H04M 3/5166 |
| 10,165,109 | B1* | 12/2018 | Custance | H04M 7/0012 |
| 2009/0168990 | A1* | 7/2009 | Makagon | G06Q 10/0631 |
| | | | | 379/265.09 |
| 2014/0376708 | A1* | 12/2014 | Deryugin | G06Q 10/06 |
| | | | | 379/265.05 |
| 2015/0281445 | A1* | 10/2015 | Kumar | H04M 3/5166 |
| | | | | 379/88.01 |
| 2017/0126893 | A1* | 5/2017 | Boutcher | H04M 3/5232 |

* cited by examiner

CONTACT CENTER SYSTEM AND METHODS FOR HANDLING VOICE AND DATA TELESERVICES THROUGH MOBILE DEVICES

CROSS REFERENCE TO RELATED APPLICATION[S]

This application claims the benefit of U.S. Provisional application No. 62/664,481, filed Apr. 30, 2018, the contents of which are incorporated herein in their entirety.

FIELD OF TECHNOLOGY

The following relates to a system and methods for operation of a contact center that integrates several subsystems required for managing voice and data teleservices with three specific attributes: mobility, elasticity, and integrality. More particularly, the following relates to a contact center system and related methods for handling teleservices in voice and data through a plurality of mobile devices such as smartphones.

BACKGROUND

The recently named "contact centers" were commonly named "call centers" in the past century since the main channel to connect with their clients was the telephone. During its almost half a century of history, the call center industry has evolved notably in terms of their services and attention channels, from telemarketing via telephone only (one channel: telephone call) to help desk or assistance via web support services, chats, and chatbots (multiple channels). Nowadays, telephonic calls are still a channel used by agents to provide teleservices to customers; however, web pages and chats have gained increasing popularity in this sector.

A typical installation of a contact center utilizes many production "rows" that are integrated in workstations or sites for agents to attend customers through several media that are commonly selected by the customer, for instance telephone calls, text messages (data), and sometimes using simultaneously different media such as e-mail, SMS, and web pages.

For instance, U.S. Pat. No. 7,092,509 B1 to Mears et al. describes a contact center of the type aforementioned. Essentially, the contact center employs three fundamental elements for its productive process: 1) People (commonly named as agents), 2) Technology (a combination of hardware and software), and 3) Telecommunication Platforms that include telephonic and/or Internet services. Among these, agents are permanently interacting in the process of the teleservice activity, always indoors (disregarding whether they are in a workstation or in a remote location), in an appropriate installation with very specific and conditioned layouts for their multiple tasks.

In terms of technological elasticity, the labor force is the single variable that constrains the elasticity of a contact center mainly because the other two main elements, i.e., technology and telecommunications platforms, are completely elastic; that is to say, technology and telecommunications platforms may increase in capacities, functionalities, and so on due to the always-developing technological advances. The scalability of technology and telecommunication platforms in the sense of a contact center only depends on the investment capacity, the complexity of installation, and the integration with other devices that interact within the architecture of the technology platform.

The technological devices that are commonly used in a contact center are interconnected through an internal net, namely LAN or WAN, which allows the transfer of all the functionality required by the services to the workstation for the agents to attend several customers using different systems and channels simultaneously. The set of devices and systems of distinct nature is called "multichannel contact center platform."

The most common elements and devices needed to provide standard functionalities in a multichannel platform are shown in FIG. 1. In this FIG. 1, there can be observed the following elements and devices of a typical contact center 100:

Private Branch Exchange (PBX) 101 is the main device in a contact center 100, it is configured to catch a call from a costumer and route it into the contact center 100 where it is then routed to a desired extension or a specific workstation. This device establishes the connection between the contact center facilities and the external telecommunication network (incoming and outgoing calls and data messages) by means of trunks and manages such connection.

Local Area Network/Wide Area Network (LAN/WAN) 102 enables the connection of multiple desktop computers and servers 106 within a site to share data-based information, transactional systems and even with remote equipment 113 through routers and switches that integrate the WAN, according to protocols and digital security criteria and predefined devices.

Virtual Private Network (VPN) 103 is a method for using a public network, such as the Internet 114, for contact center business purposes. To address the issue of security, information is encrypted at the sender site and then decrypted at the receiver site.

Automatic Call Distributor (ACD) 104 is a functionality usually integrated in the PBX 101, configured to route incoming or inbound calls from the PBX to the workstations following a logical queuing method named First-In-First-Out (FIFO). That is, the agent with more time available will be the first to receive a call. This element works in the same way for assigning chats, e-mails, and web support consultations as for routing calls.

Computer and Telephony Integration (CTI) 105 is a system device configured to make voice and data networks to work together and share information. When an agent catches a call, the screen of its computer pops-up the information retrieved from the customer that is calling and brings up the functionality required for agile teleservice.

Progressive and Predictive Dialer (PD) 107 is a device, typically a server, with software similar to that of the ACD, that also works under the FIFO criterion. The distinguishing feature of this device is that it only makes outbound calls by extracting the telephone numbers from a service or a campaign from predefined databases and assigns them by routing the outbound call to a workstation using the FIFO criterion.

Quality Assurance System (QAS) 108 is a set of monitoring tools comprising hardware (namely, recorders) and software, it is configured to select random calls in real time or batch procedures and qualify many variables related to specific attributes that each service entails.

Integrated Reporting (IR) 109 is a customized system configured to store a register of a call since its reception in the PBX 101 until its culmination when it enters the business information in Customer Relationship Management (CRM) 111. The information derived from this call is stored on a single register, no matter the points the call or contact passes through, for example the IVR 116, Voice Recording Machines 108, web interaction, CRM 111 business results (sales and/or complaints), this enables a much more accurate way to track a caller, evaluate its treatment, and find the contact business results.

Workforce Management System (WFMS) 110, is a software configured to, depending on available modules and the forecasted call load, organize work schedules and system resources, adjust predefined performance with projections, and in many cases enable cost per unit estimation of time considering the type of resource used.

Customer Relationship Management (CRM) 111 is a system configured to manage strategic procedures for the company's relationship with its customers. It uses the history of the consumers and contacts to drive the teleservices through each channel, e.g., telephone, e-mail, web page, etc., to generate added value for their clients.

Text-Chat 112a is a system configured to allow agents and customers to have a "conversation" over the Internet 114 or via a web page, generally through a "click to chat" button, and the agents interact from their workstation using a desktop computer.

Web Response (WR) 112b is a software configured to enable agents to interact with customers by taking the control of their screens to help them in their transactions and also to provide information via a chat that can be requested by the client through the web page.

Internet 114 is the public network allowing interaction and communication among components transmitting voice conversations and data as data packets from one communications device (voice, switch, PC or smartphone) to another over the Internet network.

Trunk: Also called "Line", "Exchange Line", or "Circuit", is a communication link used to connect two switching systems: most commonly a public telecommunications network 115 with a private telephonic system.

Interactive Voice Response (IVR) 116 is a self-service system configured to enable Customers to use their telephone keypad (or spoken commands) to access a system to, for example, obtain information, make a transaction with the company, or be attended by an agent.

As mentioned above, a contact center has one or more channels for receiving and generating communications between agents and customers. It requests interaction with agents at local or remote workstations using many of the devices and systems shown in FIG. 1. It also establishes connections with one another remote by using the network LAN/WAN 102 for the proper functionality of a multichannel platform.

The design or architecture of a contact center varies in function of the complexity and the evolution of the same. Table 1 below shows, from a general viewpoint, the technological functionalities that a multichannel contact center platform may have depending on its technological degree and complexity of the teleservices that it is intended to handle.

TABLE 1

Classification of typical contact centers depending on their technological degree and integration of functionalities (Technology Progression Framework).

| Basic | Emerging | Advanced | Leading Edge |
| --- | --- | --- | --- |
| Basic routing | Advanced routing & reporting | CTI routing and reporting CRM workflows | Integrating multimedia queue |
| Basic reporting | Self-Service (IVR, WEB) | Web integration (email, chat, web collaboration) | Cross Channel contact tracking |
| Basic systems | Workforce management (WFMS) | Customized servicing | Data analysis (Analytics) |
| Basic forecasting | Quality monitoring (QAS) Data screen pops (CTI) Knowledge management (KMS) | | |

Despite the technological advances in the elements, devices and systems of a contact center, to date, nobody has explored or addressed the unlimited capacities of mobile devices to enable mobility of the functionalities of a contact center, i.e., voice and data teleservices, in particular to enable mobility of workstations, more particularly of remote workstations through the use of mobile devices such as smartphones while maintaining high levels of elasticity and integrality in a contact center. This is due to the multiple difficulties that imply the integration in the cloud of all the functionalities that any contact center requires against the flexibility that the cloud provides and the complexity to integrate on a smartphone the same functionality, that the telephone and computer integrations produce, to a fixed onsite workstation connected by LAN or even WAN network.

SUMMARY

An aspect relates to the widest functional platform for contact center totally integrated in one system, with maximum elasticity to increase or decrease capacities based on the characteristics of the cloud, and capable to deliver via an agent mobile platform all the functionality of a fixed-up workstation into a smartphone.

A further aspect is to provide a method for handling functionalities of a contact center system, in which the method achieves a unique integrated system that interconnects all the devices and features that teleservices require in one platform, from recruiting agents, passing by attending clients via voice or data, to quality evaluation of each transaction and the business results registration, followed by billing and payroll functionalities, all of the contact center journey implied in one system.

The system reaches to provide the capacity to increase or decrease capacities by unit of time, given the contact centers the possibility to follow the flow of the interaction demand generated by customers, with higher accuracy meaning total elasticity for the maximum optimization of resources required.

The fully mobility of the workstations functionality via the agent mobile platform, provides a major capacity for the system to offer complete flexibility to attend at any time and any place the fluctuant demand of customer's interactions and give access to integrate the best qualified agents for each kind of teleservice.

The aforementioned aspects and deficiencies of the known art is solved with a contact center system and a method for handling teleservices in voice and data via mobile devices according to embodiments of the invention, in which, the system comprises all the components and functionalities that has a leading-edge contact center and even more to integrate the complete journey a contact center managing requires. The system according to embodiments of the invention comprises a Cloud Platform (PBX), an Intelligent ACD, and an Agent Mobile Platform. The system is configured to route a phone call via a telephone switch to the Cloud Platform (PBX), which in turn routes the call to the Intelligent ACD via Internet connection with the Agent Mobile Platform. The system is also configured to route a web-based interface to the Cloud Platform (PBX), which in turn routes the web-based interface to the Intelligent ACD via Internet connection with the Agent Mobile Platform.

A method according to embodiments of the present invention includes the steps for entering a customer's call, a chat, or web-based interaction into the system to handle communication between an agent using a mobile device and a customer via the system, with all the features that a fixed workstation usually has but now integrated in the agent's mobile device. The method according to embodiments of the invention includes the steps of routing a phone call via a telephone switch to a Cloud Platform (PBX); routing the call from the Cloud Platform (PBX) to the Intelligent ACD via Internet connection with an Agent Mobile Platform; routing a web-based interface to the Cloud Platform (PBX); routing the web-based interface to the Intelligent ACD via Internet connection with the Agent Mobile Platform.

The system and method of embodiments of the present invention allow the interaction between a caller customer, via voice or data, and an agent through the use of a mobile platform that may include all functionalities provided by a typical contact center established with fixed workstations which always make use of LAN/WAN networks. Thus, the system of embodiments of the invention has unlimited mobility, elasticity, and integrality.

BRIEF DESCRIPTION OF THE DRAWINGS

Some of the embodiments will be described in detail, with reference to the following figures, wherein like designations denote like members, within.

DETAILED DESCRIPTION

Figure 1:
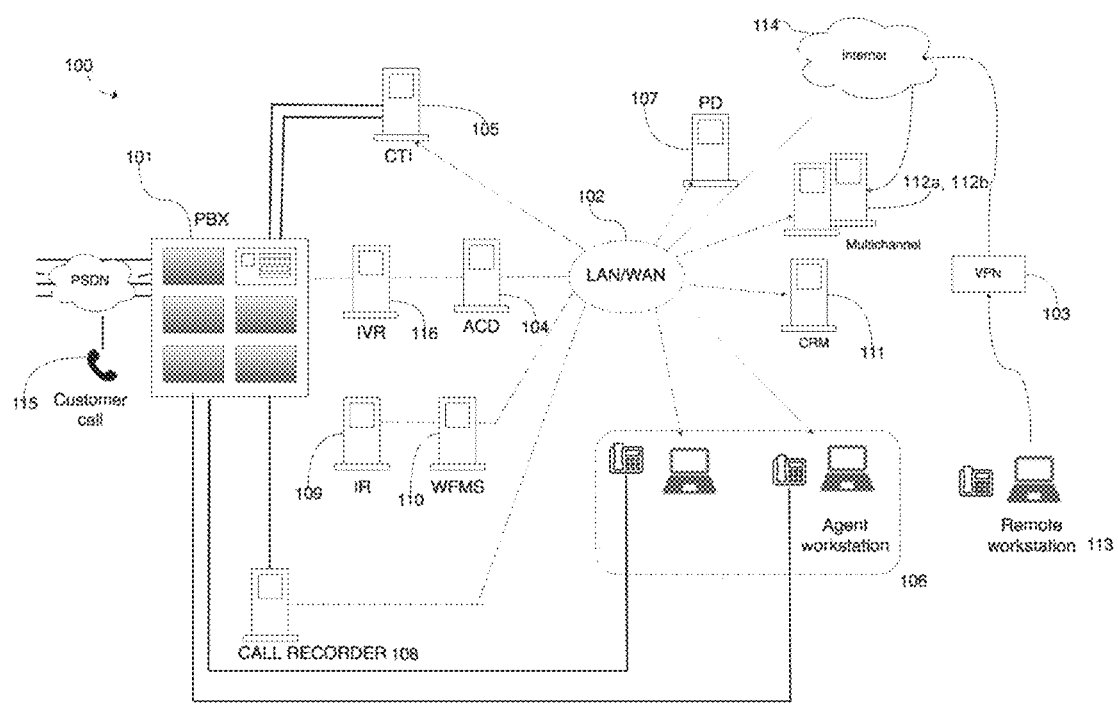
FIG. 1 schematically depicts a Multichannel Technology Basic Diagram of a contact center according to the known art.

FIG. 1 schematically depicts components of a typical contact center 100 in which the call from a customer may be routed to an agent located at a fixed workstation 106 or in a remote workstation 113.

As mentioned above, any typical contact center known to date lacks the functionality and capability to route calls from customers to remote agents using mobile devices, such as smartphones, with all the functionalities that a typical workstation has. Accordingly, the inventors of embodiments of the present invention have developed and put into practice a system and a method for routing a call from a customer to an agent mobile platform with all the functionalities related to a contact center platform that enables the agent's device to receive a customer's call or chat.

In the sense of embodiments of the present invention, the terms "agent mobile platform", "mobile platform" or simply "platform" are used interchangeably unless otherwise indicated and refer to a combination of a mobile device, such as a smartphone, an application (commonly known by its abbreviated form "app") installed, and running on the mobile device, and a set of earphones, belonging to and used by an agent.

Similarly, the terms "contact center system", "contact center," and "system" are used interchangeably hereinafter and refer to a system for handling voice and data teleservices of a contact center in accordance with the embodiments of the invention described below in further detail.

Furthermore, the term "enterprise client" or simply "client" refers to the companies or enterprises that offer the service of contact center or call center to their customers to provide them with help about the services and products those companies or enterprises provide. The term "customer" refers to the people that seek help or information from the companies or enterprises.

Generally speaking, the contact center system according to embodiments of the present invention is capable to route a call from the customer's device, using a local telecommunications network, to the contact center system which transforms it into a digital call due to the characteristics of the VPN network used, the system is able to identify the caller and, based on predetermined criteria and business rules, the call is assigned to an agent using the mobile platform. Further, the contact center system is also capable of handling customer's calls through the Internet communications protocol, which is not transported via telephone network, but instead, through an encrypted data channel; in this case, the agent's mobile device shows the customer's information. As soon as the communication between the agent and the calling customer is established, irrespective of the channel (telephone call or chat), the contact center system automatically starts the recording of the call. When the interaction between agent and client finalizes, the system converts the whole recorded conversation into text for quality assessment; for example, to compare each word with a list of keywords. The intention of quality assessment is to generate and provide alerts to the agent for rapid feedback.

Figure 2:
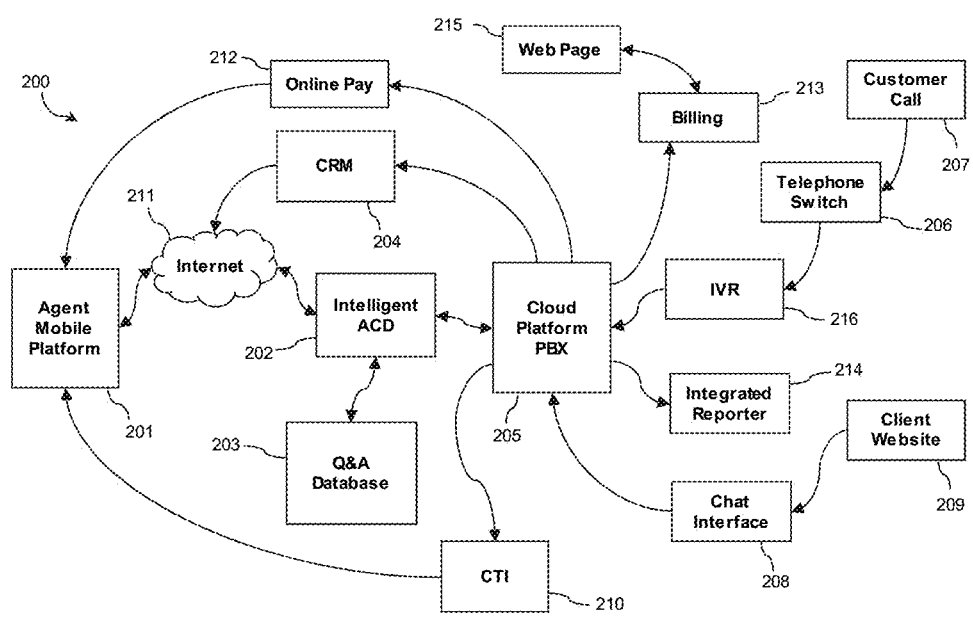
FIG. 2 schematically shows components of a contact center system for routing a customer's call to an agent logged-in into the contact center's system according to embodiments of the present invention.

FIG. 2 schematically shows components of a contact center system 200 for routing a customer's call to an agent logged-in into the contact center system according to embodiments of the present invention. Some of the elements shown in FIG. 2 have been previously shown in FIG. 1 and described in the chapter titled "state of the art," whereby explanation of some of these elements is omitted for the sake of brevity. The functions and characteristics of some of the elements shown in FIG. 2 are similar or equivalent to those of the elements shown in FIG. 1 unless otherwise indicated.

System 200 is a multi-channel platform that uses a mobile application (see FIG. 3 and related description below), a management website, and a webpage for enterprises' clients to request services, contract services, and check reports related in an automatic fashion.

The system 200 enables the interaction between users of products or services with an agent via voice or data disregarding the location of the agent. To accomplish this goal, the agent only requires a mobile device, such as a smartphone, and connection to the Internet.

To accomplish the aforementioned aspects of embodiments of the invention, as shown in FIG. 2, contact center system 200 includes an agent mobile platform 201, an intelligent ACD 202, and a Cloud Platform (PBX) 205 which communicate with each other via Internet 211.

Agent mobile platform 201 is configured to enable an agent, via a mobile device such as a smartphone, to handle interaction 207, 209 initiated by a customer either through voice (a typical phone call) 206 or data (chat) 208. An intelligent ACD 202 generates a queuing order based on predetermined parameters, for example the time each call enters, the status and qualification information of the agents 201 that is stored in a Q&A Database 203 before establishing the interaction with the customer.

Cloud Platform (PBX) 205 should have sufficient elasticity to receive one or millions of calls at a time and the capability of login-in one, hundreds, or millions of agents in an immediate fashion; additionally, it must be capable to increase or decrease these capabilities instantaneously by adjusting the ranges according with demand. Further, it should offer the connectivity capacity through SDK or API to integrate an agent extension with all the necessary functionalities, such as receiving or transferring calls while offering the possibility to choose from a bunch of local numbers that can be selected by the enterprise clients such as 1-800, as well as for different countries and cities around the world, additionally for routing it might use SIP dedicated trunks.

The Cloud Platform (PBX) 205 is configured to offer local phone numbers or 1-800 numbers to provide customers with easy access to the customer service. This is achieved through the integration of VoIP and a countless series of numbers in multiple cities around the country and worldwide to attend clients easier and with complete elasticity. This functionality of the Cloud Platform (PBX) 205 provides enterprise clients with the capacity to increase and decrease an uncountable number of simultaneous calls without having to acquire extra technological infrastructure to capture the peaks in traffic that the teleservice demand may experience during certain seasons or even intraday. Communication transfer from the public global or local telecom network 206 to the Cloud Platform (PBX) 205 is accomplished through VoIP interconnection, which means that the transfer can be done from anywhere around the world, and linked this event (call 207 or chat or web-support 209) to an agent 201 that is available everywhere using Internet 211 to attend customer's requests, while providing total elasticity to the enterprises using or adhering to this unique system for their teleservices.

As shown in FIG. 2, system 200 includes different modules that enable all types of communication functionalities required for any leading-edge contact center platform (see Table 1); these modules are announced in a non-limitative manner below:

Inbound module. The system 200 can attend and route calls 207 and/or chats 209 from any place to the cloud platform (PBX) 205 through Internet 211 and assign it to an agent by means of an Intelligent ACD 202.

Outbound module. The system 200 includes a database (CRM) 204 that stores telephone customer numbers; database (CRM) 204 is configured to automatically dial one by one and transfer a call 207 to an agent 201 available. Accordingly, a call is attended in the same way as an inbound call, providing the enterprise client with greater security regarding its information, given that the information that is shared with the agent is limited to the one predefined by the enterprise client and encrypted previously.

Announcement module. This functionality allows the system to automatically announce to the customer the name of the agent who will be assigned his call, before the agent catches the call; it is configured to play customized messages for each telephone number handled by the system 200, e.g., "thank you for calling to . . . ", and provide the agent's name to the customer before interaction is established.

Self-Service module. The system 200 includes Interactive Voice Response (IVR). IVR is configured to enable customer self-service that contains the most frequent options of auto-dispatch through an option menu that can be operated by the customer himself by making use of the telephone keyboard.

Figure 3:
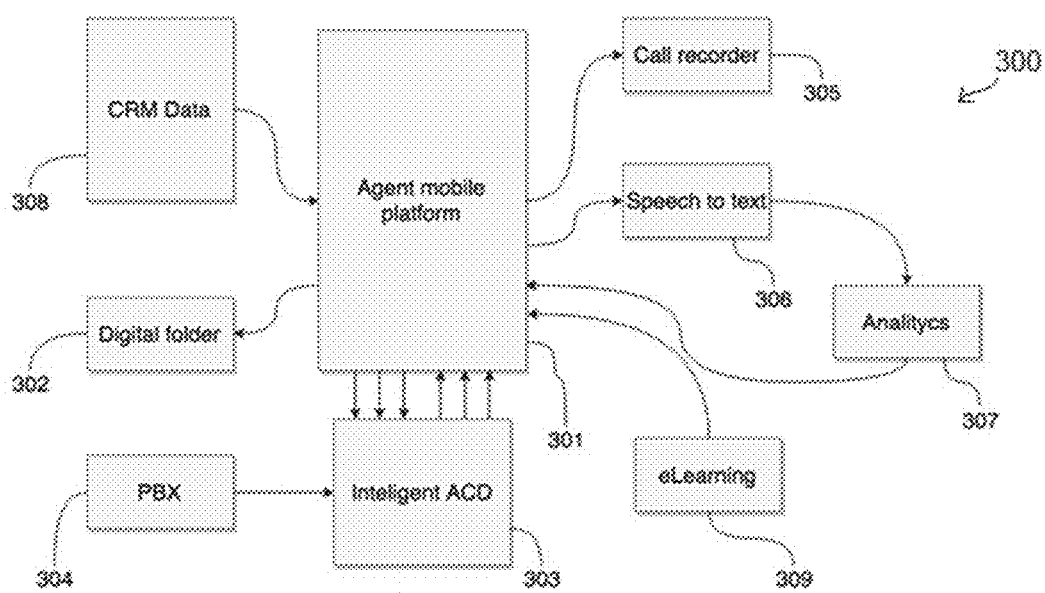
FIG. 3 schematically depicts a method and elements involved for routing an incoming call to an agent's mobile platform from the PBX according to embodiments of the present invention.

System 200 is designed with a high degree of complexity and wide integration scope, which offers a unique elasticity, mobility attention, qualified connection of agents, and an integral management of teleservices thanks to specific modules that cover everything from agent's recruiting process, training, and certification using e-learning methodology (309, see FIG. 3). It is also able to handle the monitoring of individual performance, automatic payroll 212, and billing 213 for enterprise clients.

System 200 has a module for enterprise clients to enter data, through a web page 215, with which they can answer a list of questions that will give them a whole picture of the characteristics of the teleservice that need to be put into operation through innovative platform to meet their necessities.

Chat & Chatbot subsystem 208. System 200 enables digital channels other than voice such as e-mail, web support and those most commonly used nowadays: chat or chatbot. This subsystem is used to have an agile response to basic inquiries; it is offered as the forefront and depending on the business rules, chatbot can interact in parallel with agent chats to offer more complete and better qualified answers for customer interactions. The way these events are assigned is determined by the intelligent ACD 202.

Rapid Q&A Database 203 is a subsystem running in real time during the customer/agent interaction in a recording mode and when the interaction finishes; it is configured to transcript at least a portion of the recorded interaction and compare it with a list of keywords to provide rapid feedback to the agent. In addition, the system 200 is configured in such a way that one record channel is dedicated for the agent and another channel is dedicated for the customer; this provides the system 200 with the capacity to identify whether one of the parties is interrupting the other or not, qualify each event as soon as its ends, among other features for quality purposes. This information is delivered to the agent, and because the storage is performed in the cloud, the capacity to evolve this recording functionality is unlimited and can be played at any time as part of the quality assurance report and it can also be reproduced to any business whose rules determine so in order to improve the service.

Agent access is the entrance to the agent mobile platform 201, it is given through an application designed for mobile devices such as smartphones, after entering a code that the system 200 assigns each candidate agent during their first contact. During the agent's operational period, agents can consult their qualifications, record of hours signed-in into the system, and call or chats results, to obtain, for example, a monetary compensation, and at a pre-established date withdraw it using an electronic payroll module 212. Module 212 is a subsystem that enables payment transfers for the agent's services at pre-established dates. This is one of the extended functionalities that are integrated in the system 200 that makes a differentiable end-to-end transversal integration for contact center management.

Integrated Reporter 214 is a subsystem configured to perform more detailed managing functions by obtaining information from each part of the system or module. This type of functions starts by requiring recruitment, training, and agent qualification. Then, Integrated Reporter 214 requires the proper parameters related to the characteristics of calls or chats and the result of the operational performance, together with business results (CRM information) and billing and payroll derived; complete tracking is possible due to the integrity and full scope functionality of the system 200, the agent platform 201, and cloud-based open architecture. This combination of elements gives the most elastic and complete contact center multi-channel platform.

Reference is now made to FIG. 3 that schematically depicts the elements involved for routing an incoming call to an agent's mobile platform (201, FIG. 2) from the PBX (205, FIG. 2) according to embodiments of the present invention.

FIG. 3 shows a module for agents 301 to register into the mobile platform that guarantees the identity of each agent and creates a digital folder 302 that enables the individual's verification in each interaction provided to the customers. This module is designed under self-service criteria for the registration process of agents, with the availability it allows to choose the campaign or service the agent prefers to attend, take respective e-learning 309 lessons, and get certified to be ready to receive calls or chats (207, 209, FIG. 2) from customers in a practically immediately way following installation of an agent's mobile platform on their mobile devices.

It is important to note that the agent's mobile platform 301 has minimum hardware requirements, namely, the mobile device must include a screen of at least 640×1136 pixels, 1 Gb in Ram, 16 Gb storage, a processor with double nuclei and 1.3 GHz. Through this device, the agent receives the customer's interaction with the enterprise, the customer's call originated in a local telephone network routed to a 1-800 number is transported in order to catch it in the public switch telephone network (206, FIG. 2) and immediately convert it into Voice over Internet Protocol (VoIP) to then route it via Internet network to the agent's platform 301 which enables the agent to receive the customer's interaction at any time, everywhere, provided that the place the agent is has Internet connectivity via data and/or Wi-Fi.

With these features of embodiments of the present invention, the contact center eliminates the need for costly sites or workstations, and all the LAN/WAN (102, FIG. 1) installations that any contact center currently uses to interconnect their different technology devices, and the system then provides a new and unpracticed way for routing a call from a PBX to an agent extension and shares data useful through the PC via a LAN port fixed to the workstation.

Agent mobile platform 301 enables the agent to combine the use of the mobile device's camera to generate an electronic digital folder 302, which is integrated with an official ID and a photo selfie through the creation of a user and password. To thoroughly verify the identity of the agent, three photos will be asked of him/her: two of their ID, front and back, and a selfie, all this information is then encrypted and sent to the cloud storage.

FIG. 3 shows stages of a method 300 with which an agent receives a customer interaction (207, 209 in FIG. 2) from an intelligent ACD 303, which uses the previous business rules to validate and route calls to the respective available agents. This function is originated when an agent opens his/her mobile platform 301 reporting to the intelligent ACD 303 his/her availability to receive interactions (207, 209 in FIG. 2), together with his record from a Customer Relationship Management (CRM) 308 to take account for attended customers, the intelligent ACD 303 will then notify the capacity to receive interactions into the platform to a Private Branch Exchange (PBX) 304 and at the moment that a customer's call enters, PBX 304 transmits it to the intelligent ACD 303 to be routed to the agent platform 301 via Internet (211, FIG. 2).

Figure 4:
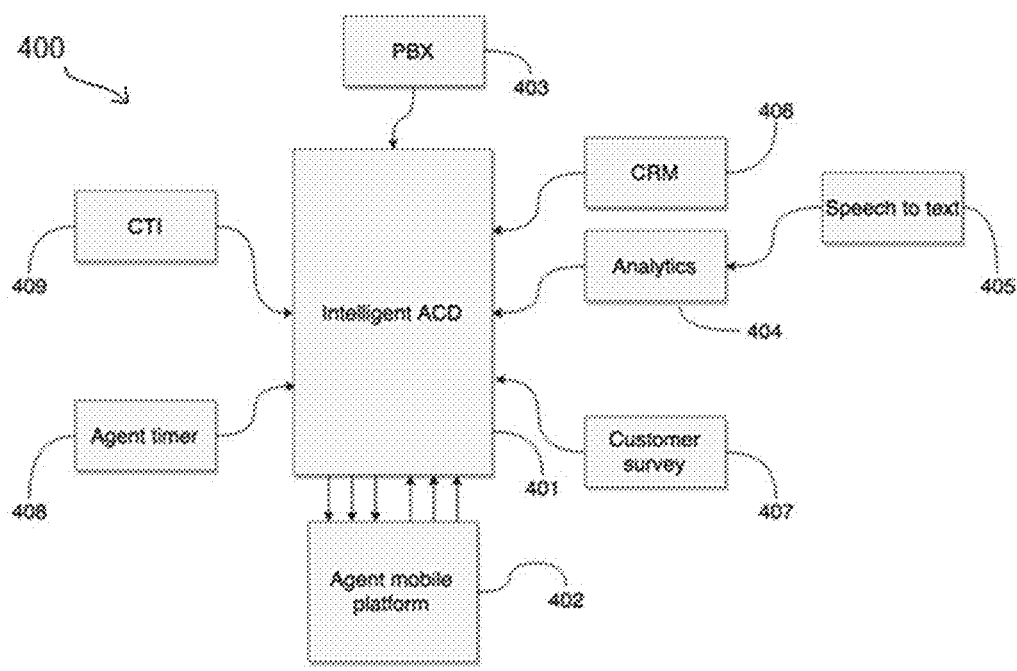
FIG. 4 schematically depicts a method and elements of an intelligent ACD for handling interaction between a customer and an agent according to embodiments of the present invention.

Reference is now made to FIG. 4 schematically depicting elements that communicate with an intelligent ACD 401 to handle interaction between a customer and an agent according to embodiments of the present invention.

Intelligent ACD 401 is a logical device that enables the system (FIG. 2) to reach the best ranked agent logged in real time for each inbound or outbound customer interaction, independently of the agent's location at any time. The system captures a call or chat 403, takes the characteristics of the customer from a CRM 406 and follows the business rules predefined for agent profile 402. Intelligent ACD 401 is also configured to consider the most recent agent's qualifications 404, 407 among all agents signed-in into the system and available in the mobile platform 402 to route it to the best match at the moment that the request is attended.

Intelligent ACD 401 shown in FIG. 4 includes several elements that in combination work to determine the right routing of each call from the bunch that the PBX 403 receives to the best ranking agent, taking into consideration agent's login time 408 and ready status time, which means that the agent is available to catch a customer interaction using information linked with the telephone number by CTI 409, which in turn enables the agent to obtain the customer information into the CRM 406, and obtain or retrieve basic data related to the customer, and also customer surveys that customers may answer in real customer survey 407, adding to analytics 404 obtained from speech-to-text conversion 405 through the platform evaluate each conversation and qualify the interaction, all these components are considered at real time by the platform in order to choose an agent to route the call via his mobile platform 402, using all the elements shown in FIG. 3.

Intelligent ACD 401 shown in FIG. 4 includes several elements that determine the routing of a call from a set of calls entering through a specific telephone number into PBX 403. Basic considerations for routing the call are, for example login time of the agent and ready status time. Then, according to the customer's telephone number obtained from CTI 409, Intelligent ACD 401 grants access to the information of the respective customer filed into the CRM 406 to obtain basic customer's data, such as place (where he/she lives), gender, type of service plan or product contracted, and also the Intelligent ACD 401 checks a qualification given to the agent from Customers Survey 407, adding the Analytics 404 obtained from Speech-to-Text module 405 which is configured to transcript the whole conversations between agent and customer, and finally with all this data related to availability, kind of service requested, likelihood of empathy with the calling customer, and quality rates, routes the call using all the elements shown in FIG. 3 previously described to the best agent available using their agent mobile platform 401.

Agent Dynamic Status is a module available once the agent has registered in the interface database 302. Firstly, the set of agents that are available in real time, e.g., signed-in to the agent mobile platform for each campaign or teleservice for any enterprise client, and second for each available agent having acknowledgment of his/her profile determined by the enterprise clients, with the business rules, and their individual qualifications (203, FIG. 2) which enables the system to assign the next customer call or chat to the best qualified agent using the system.

Figure 5:
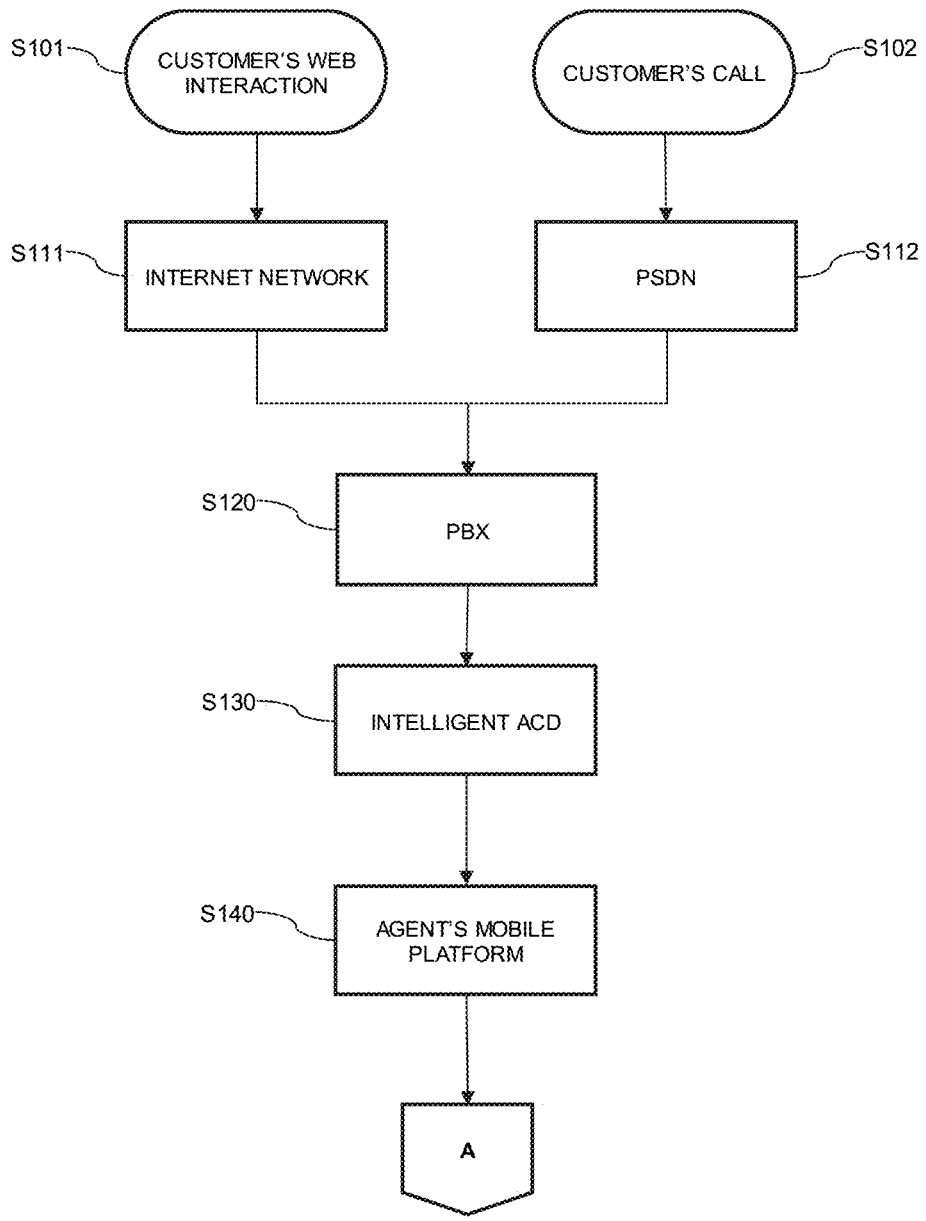
FIG. 5 is a flow chart illustrating steps of a method for receiving a customer's call in the contact center according to embodiments of the present invention.

With reference to FIG. 5, there is shown a flow chart illustrating steps of a method for receiving a customer's call in the contact center shown in FIG. 2 according to embodiments of the present invention. The method begins with activity from a customer either through a web page S101 (209 in FIG. 2) or a phone call S102 (207 in FIG. 2). In case customer's activity begins with the customer making use of a web page, method continues to step S111 in which customer's activity is carried out through an Internet connection, which in turn is routed to a Cloud Platform (PBX) (205 in FIG. 2). In case customer's activity begins with a phone call, for example to a local number or 1-800 number provided by an enterprise or company, method advances to step S112 in which a Public Switched Data Network (PSDN) (206 in FIG. 2) routes the call to Cloud Platform (PBX). Once the customer's activity reaches the Cloud Platform (PBX) in step S120, Cloud Platform (PBX) communicates with Intelligent ACD (202 in FIG. 2) which in turn, based on predetermined parameters such as qualification of the agent, which is stored in Q&A database (203 in FIG. 2), determines one of a plurality of agents signed in the contact center system and routes the call to that agent via its agent mobile platform in step S140. At this moment, a communication is established between customer and agent; this interaction agent/customer is recorded in the system for quality purposes. Steps of such recording are explained in further detail with reference to FIG. 6, described herein below.

Figure 6:
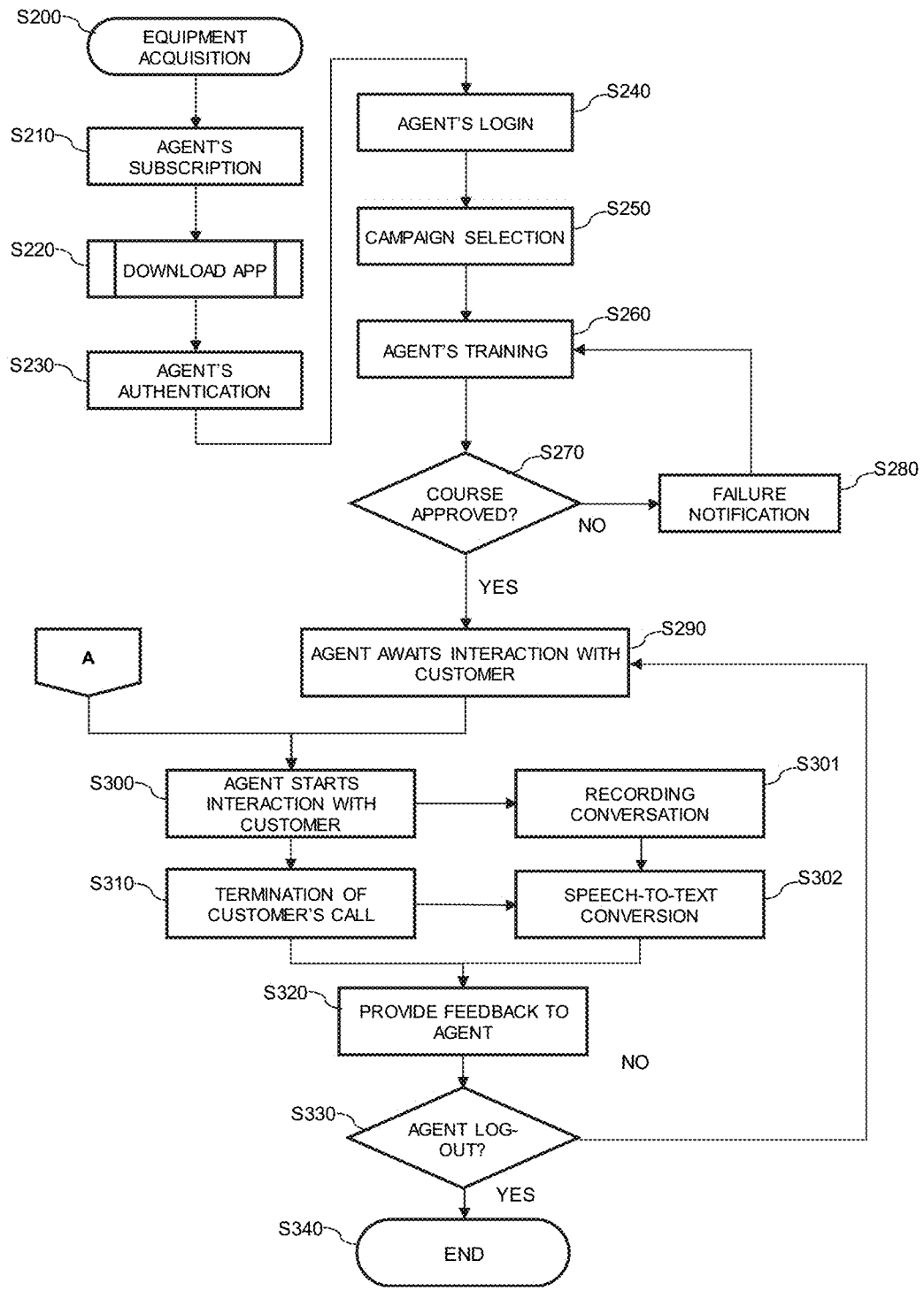
FIG. 6 is a flow chart illustrating steps of a method for an agent to register, log-in and communicate with a customer through the contact center's system according to embodiments of the present invention.

FIG. 6 shows a flow chart illustrating steps of a method for an agent to register, log-in and communicate with a customer in the contact center according to embodiments of the present invention.

As mentioned above, the contact center system according to embodiments of the invention achieves mobility of agents with the use of a mobile device such as a smartphone. With such device, an agent is able to attend customer's activity via phone calls or web-based services (chat, for example). For any person showing interest in becoming an agent in the contact center system according to embodiments of the invention, such person must first acquire equipment with minimum hardware requirements (step S200). These requirements were mentioned above in relation to FIG. 3. Most importantly, the equipment must include Internet connectivity, for example via Wi-Fi or data connection (e.g., 3G, 4G, 4.5G or superior).

Once the person has acquired the equipment (mobile device), the person should generate a subscription (step S210) in the system by downloading the Agent Mobile Platform (step S220). In this stage, the person is required to generate a user's profile that must include, at minimum, for example a copy of a valid identification that is captured with the mobile device's camera, a photo selfie, and a username and password, for authentication purposes. Accordingly, every time a person desires to sign-in into the system using the mobile device, the system authenticates the user by requiring the username and password to be input but also requesting taking another photo selfie, which is then compared with the previously stored photo selfie. When the interested person has created the user profile, the person is required to authenticate himself/herself and then he/she is recognized by the system as a trusted agent (step S230). The agent then logs-in to the system (step S240) and selects a campaign (step S250) to receive material, guidance, and experience related to the teleservices handled by the system. Following agent's selection of a campaign, agent receives material for his/her training (step S260) which understanding is evaluated (step S270) to determine whether the agent has skills to start attending customer's calls. In case agent fails to demonstrate skills and understanding of the course, agent receives a failure notification (step S280) allowing the agent to re-take training.

Once agent approves the course, the agent is enabled with access to the contact center system and then awaits interaction with a customer (step S290). At this point, the system handles connection between a caller customer, as explained in relation to FIG. 5, and a signed-in agent. This connection is established between the customer calling from a phone or typing in a website and the agent using the mobile device (step S300) via the Intelligent ACD (202 in FIG. 2). Simultaneous to the beginning of interaction between customer and agent, the system begins recording the conversation between customer and agent (step S301) by means of, for example, CRM (204, FIG. 2). According to embodiments of the invention, the system may be configured to record a predefined lapse of the conversation for example, the system will record by default 100% of the conversation's time.

When interaction agent/customer finalizes (step S310), the system stops recoding the conversation and then automatically converts a selected time portion thereof into text (step S302). According to embodiments of the invention, the time portion of the conversation that is converted into text may be selected from a list of key words and count how many times are mentioned during the recorded conversation's time.

Following termination of interaction agent/customer and speech-to-text conversion of the recorded conversation, the system generates a report including a qualification that is transmitted to the agent's mobile device for feedback purposes (step S320). At this point, the agent may choose exiting the system or continuing attending customers (step S330). If the agent desires to exit the system and stop attending customers, agent should log-out of the system (step S340); otherwise, the method return to step S290 in which the agent waits for interaction with further customers.

It is expected that during the life of any patents derived from this application many technological advances will be developed and the scope of the corresponding terms in the present description are intended to include all such new technologies a priori.

The terms "comprises," "comprising," "includes," "including," "having," and their conjugates mean "including but not limited to."

As used in the present specification, the singular forms "a," "an," and "the" include plural references unless the context clearly dictates otherwise.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A contact center system for handling inbound and outbound communication through voice and data between an application running on an agent's mobile device and a customer's phone or Internet-connected device, the contact center system comprising:
    an Agent Mobile Platform comprising the application installed on the agent's mobile device, wherein access to the contact center system is allowed after authentication of the agent, authentication comprising comparing, by the system, a verified image of the agent and a contemporaneous photograph of the agent taken via the agent's mobile device;
    a Customer Relationship Management (CRM) module, and an e-learning module configured to permit the agent to choose a campaign or service, take e-learning lessons, and to get certified to receive calls or chats from customers through the mobile device; and
    a Private Branch Exchange (PBX) in the cloud, and an Intelligent Automatic Call Distributor (ACD) and a Rapid Quality Assurance Recorder and Analytics database integrated in the cloud with the PBX;
    wherein the PBX, the Intelligent ACD and the Rapid Quality Assurance Recorder and Analytics database communicate to each other via Internet;
    wherein the contact center system is configured to:
        route an inbound phone call or a web-based interface via Internet to the PBX, which in turn routes the inbound phone call or web-based interface, via the Intelligent ACD, to the application of an available, certified agent's mobile device geographically closer to the customer;
        record the whole interaction between the agent and customer;
        convert, at the end of interaction between the agent and customer, the whole recorded conversation into text; and
        provide rapid feedback to the agent with the use of the Rapid Quality Assurance Recorder and Analytics database, wherein the converted text is subjected to a quality assessment.

2. The contact center system according to claim 1, further comprising:
    an Interactive Voice Response (IVR) module in the cloud, and a Recorder and Analytics module in the cloud, wherein the contact center system and the Recorder and Analytics module are configured to provide rapid feedback to the agent at the end of interaction between the agent and customer.

3. The contact center system according to claim 1, wherein the Intelligent ACD includes enriched First-In-First-Out (FIFO) criteria.

4. The contact center system according to claim 3, wherein the Intelligent ACD is configured to:
    establish communication between an agent and a customer further based on quality parameters gathered from the Rapid Quality Assurance Recorder and Analytics database; and
    combine the quality parameters and the enriched FIFO criteria with the customer's location and the agent's location closest to the customer's location.

5. The contact center system according to claim 1, wherein a communication between the Intelligent ACD and the agent's mobile device application is established via Internet protocol.

6. The contact center system according to claim 1, wherein the application running on the agent's mobile device is configured
    to communicate, via Internet, with the PBX in the cloud, the Intelligent ACD and the Rapid Quality Assurance Recorder and Analytics database,
    to handle inbound and outbound interaction with a customer's device through voice and data,
    to handle authentication, logging-in and logging-out of the agent, and
    to handle an agent's selection of a service or campaign.

7. The contact center system according to claim 1, wherein at least one selected portion of the interaction between the agent and the customer is converted to text.

8. The contact center system according to claim 7, wherein the at least one selected portion is selected based on a list of key words from the interaction.

9. A method for handling inbound and outbound communication through voice and data between an application running on an agent's mobile device and a customer's phone or Internet-connected device, comprising the steps of:
    receiving a contemporaneous image of the agent taken by the agent's mobile device;
    comparing the contemporaneous image to a verified image associated with the agent and authenticating the agent when the contemporaneous image sufficiently matches the verified image;
    providing and displaying to the agent a selectable campaign or service comprising e-learning lessons;
    certifying the agent to receive calls or chats from customers through the mobile device upon determining that the agent has successfully completed the campaign or service;
    routing an inbound phone call via a telephone switch to a Private Branch Exchange (PBX) in the cloud;
    routing the inbound phone call from the PBX via an Intelligent Automatic Call Distributor (ACD) integrated in the cloud with the PBX via Internet to the agent's mobile device application;
    routing an inbound web-based interface to the PBX;
    routing the inbound web-based interface from the PBX via the Intelligent ACD integrated in the cloud with the PBX via Internet to the agent's mobile device application;
    recording, by means of the Intelligent ACD, the whole interaction between the agent and customer; converting, at the end of each interaction between the agent and customer, the whole recorded conversation into text; and
    providing, at the end of each interaction between the agent and customer, rapid feedback to the agent with the use of the Rapid Quality Assurance Recorder and Analytics database.

10. The method according to claim 9, wherein routing the inbound call or web-based interface further comprises:
  logging-in of the user; and
  providing and displaying rapid feedback retrieved from the Rapid Quality Assurance Recorder and Analytics database based on analytics ran over the recorded interaction between the agent and customer.

\* \* \* \* \*